March 2, 1965 C. E. LONG ETAL 3,171,591

PAY TELEPHONE COIN RECEPTACLE

Filed Oct. 12, 1962 2 Sheets-Sheet 1

INVENTORS
CLARENCE E. LONG
BY THOMAS E. GLEASON
Fishburn and Gold
ATTORNEYS

INVENTOR
CLARENCE E. LONG
BY THOMAS E. GLEASON
Fishburn & Gold
ATTORNEYS 3,171,591
PAY TELEPHONE COIN RECEPTACLE Clarence E. Long, Ottawa, Kans., and Thomas E. Gleason, 420 W. 4th, Ottawa, Kans., assignors to said Gleason, as trustee Filed Oct. 12, 1962, Ser. No. 230,074
2 Claims. (Cl. 232—1)

This invention relates generally to pay telephones and more particularly to remote coin storage receptacles therefor.

Considerable monetary losses are continually borne by telephone operating companies due to the destruction of pay telephones accompanying the theft of coins contained therein. Conventional pay telephones are constructed with an integral lower chamber portion within which coin storage is maintained in a removable coin box between periodic collections by telephone company personnel. Emptying the chamber portion is accomplished by unlocking and removing a door on the telephone body to permit the withdrawal of the coin box therein which, upon removal from the telephone body, automatically locks to prevent tampering by the collection personnel. An empty coin box is then inserted into the chamber portion of the telephone and the door is replaced and locked into position. Heretofore when a thief attempted to obtain the coins contained within the telephone chamber portion, the usual practice was to remove the entire telephone from the telephone booth or the like and transport same to a remote or hidden location whereupon the telephone was substantially destroyed by breaking to release the money contained therein. The destruction of the telephone has nearly always resulted in a monetary loss to the telephone company greatly exceeding the cash loss due to theft of the coins, and the losses together have produced a serious drain on company funds.

The principal objects of the present invention are: to provide apparatus for discouraging the destruction of pay telephones by eliminating the storage of coins therewithin; to provide such apparatus which causes coins deposited in the telephone to be directed to a location remote from the telephone and very difficult of access without a proper key; to provide such apparatus which uses the conventional pay telephone self-locking coin box and access door so as to require a minimum of new parts; to provide such an apparatus which takes advantage of the usual concrete slab forming the floor of an outside phone booth for increasing the inaccessibility of the coin box; to provide a transparent panel in place of the access door usually found on the body of the telephone for visually demonstrating to a would-be thief that no money is contained in the telephone coin box chamber; and to provide such an apparatus which is simple in construction, inexpensive to assemble with existing pay telephone installations and highly efficient for its intended purpose.

Other objects and advantages of this invention will become apparent from the following description taken in connection with the accompanying drawings, wherein are set forth by way of illustration and example certain embodiments of this invention.

Figure 1:
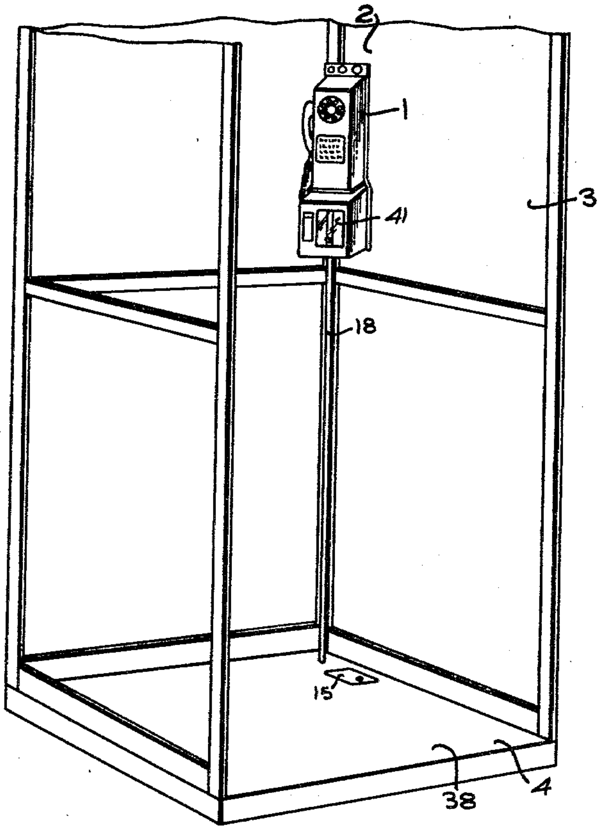
FIG. 1 is a fragmentary perspective view showing a pay telephone mounted on a wall of a phone booth and assembled with apparatus embodying this invention.
Figure 2:
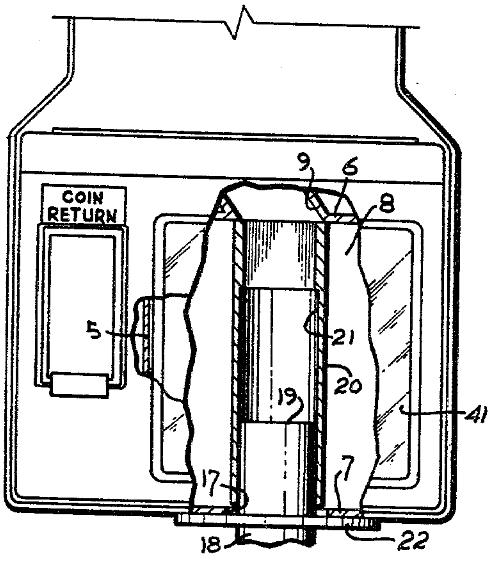
FIG. 2 is a fragmentary front elevational view on a larger scale with a portion broken away showing the upper end of a coin directing tube communicating within the telephone coin box chamber.

Referring to the drawings in more detail:

The reference numeral 1 indicates a conventional pay telephone mounted on or adjacent the walls 2 of a telephone booth 3 having a poured break-resistant concrete slab floor 4. The pay telephone 1 is of the common variety having side walls 5, a top wall 6 and a bottom wall 7 forming an integral coin box receiving chamber 8. A coin chute 9 communicates with the coin box chamber 8. A self-locking coin box is shown at 10 and is of the conventional type heretofore adapted to be received in the coin box chamber 8 and be automatically aligned to receive coins from the coin chute 9. The self-locking box 10 has a spring urged arm 11 which normally resiliently engages with a suitable device (discussed below) heretofore contained in the coin box chamber 8 for opening a coin door 12 upon inserting the coin box 10 into the coin box chamber 8. The opening of the coin door 12 presents an open pathway 13 through which coins normally drop from the coin chute 9 into the coin box 10. Upon subsequent removal of the coin box 10 from the coin box chamber 8 the arm 11 moves over a path 11' causing the door 12 to close and lock into closed position to prevent telephone company collection personnel from tampering with the contents without breaking a suitable seal (not shown) on the coin box. The device for engaging the arm 11 is normally mounted on the top wall 6 of the telephone body, however for the purpose of illustrating this invention, the device is shown removed from the top wall 6 and is designated 14. The device 14 is mounted in a portion of apparatus described hereinafter.

A removable coin box chamber door 15 is adapted to close the telephone coin box chamber 8, permitting normal access thereinto only by using the proper key (not shown) in a key slot 16. For the purpose of illustrating this invention the chamber door 15 is shown assembled with a portion of the apparatus described hereinafter.

Referring more specifically to this invention, an opening 17 is formed through the bottom wall 7 of the coin box chamber 8. An elongated tube 18 has an upper end 19 telescoping upwardly through the opening 17. A suitable sleeve 20 slidably receives the upper end 19 thereinto and provides a communicating passageway 21 between the tube 18 and the coin chute 9. It is noted that the sleeve 20 must be inserted into the coin box chamber 8 before the tube upper end 19 is telescoped through the bottom wall 7 and that the sleeve 20 cannot be removed without either raising the telephone or lowering the tube 18. A suitable collar 22 is secured to the tube 18 and provides a stop engaging the bottom wall 7 to prevent further upward motion of the tube 18 with respect to the telephone.

Figures 3, 4:
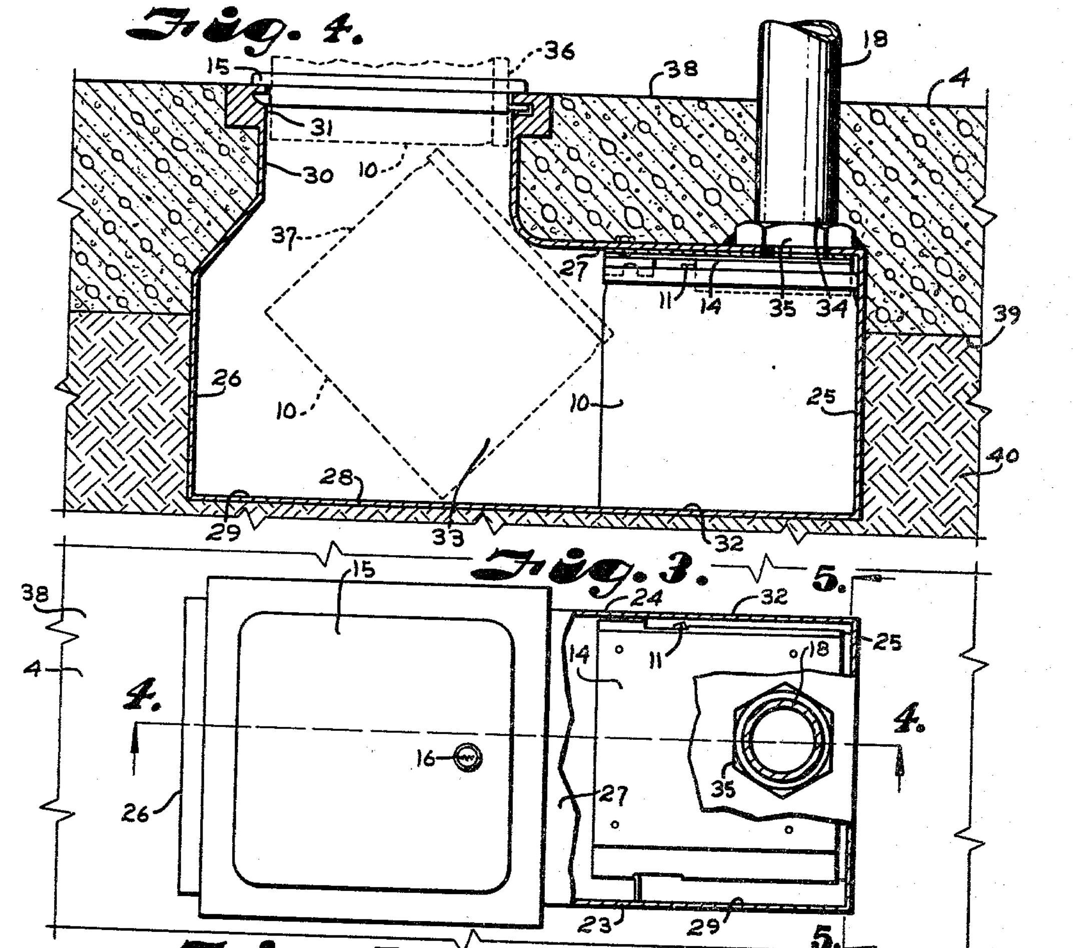
FIG. 3 is a fragmentary top view on a larger scale of a coin box receiving receptacle embedded in a concrete slab forming the floor of the booth of FIG. 1 with a portion broken away to show the self-locking coin box actuating assembly therewithin.
FIG. 4 is a fragmentary cross-sectional view through the coin box receiving receptacle taken on the line 4—4 of FIG. 3 showing the coin box therein.
Figure 5:
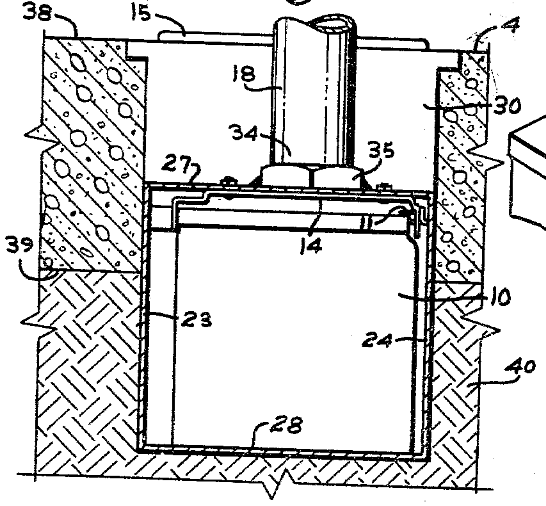
FIG. 5 is a cross-sectional end view through the coin box receiving receptacle taken on the line 5—5 of FIG. 3 showing the self-locking coin box resting beneath the coin directing tube.
Figure 6:
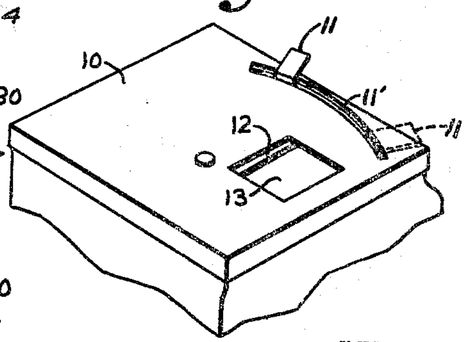
FIG. 6 is a fragmentary perspective view on a larger scale showing the upper portion of a conventional self-locking coin box used with pay telephones.

Referring particularly to FIGS. 3, 4 and 5 tough metal side walls 23 and 24, end walls 25 and 26, a top wall 27 and a bottom wall 28 are suitably secured to each other forming a receptacle 29. The receptacle 29 has an upwardly extending neck portion 30 terminating at the upper end thereof in an open mouth 31. The receptacle 29 also has a foot portion 32 communicating with the neck portion 30 through an intermediate portion 33. The foot portion 32 is offset laterally from the neck portion 30 and is spaced below the level of the mouth 31 as illustrated in FIG. 4. The tube 18 has a lower end 34 secured to the top wall 27 by means of a collar 35 preferably welded respectively thereto, the tube lower end 34 opening downwardly into the foot portion 32.

The neck portion 30 is adapted to receive the coin box 10 downwardly thereinto through the open mouth 31 as indicated by the broken lines at 36. Sufficient room is provided in the intermediate portion 33 to permit the coin box 10 to be turned as indicated by the broken lines at 37 for pushing the coin box 10 into the foot portion 32. The foot portion 32 is adapted to receive the coin box and direct same into a position whereby the pathway 13 aligns with the tube lower end 34 for receiving coins therefrom.

The coin box actuating assembly or arm engaging device 14 is suitably mounted on the top wall 27 within the foot portion 32 for engaging the coin box arm 11 in a conventional manner for opening the coin door 12 as the coin box 10 is inserted into the foot portion 32. The removal of the coin box 10 from the foot portion 32 relieves pressure on the arm 11 permitting the coin door 12 to close and lock in the conventional manner.

The coin box chamber door 15 is adapted to be received on and engaged with the mouth 31 of the neck portion 30 for selectively, lockably closing the neck portion 30 to prevent undesired access thereinto.

The receptacle 29, in the illustrated example, is remotely located beneath the telephone 1 below ground level and the concrete slab floor 4 is poured therearound whereby the upper surface 38 of the slab floor is substantially flush with but does not cover the mouth 31. The concrete slab 4 covers the foot portion 32 and surrounds the neck portion 30 and tube lower end 34 (FIG. 4). The bottom surface 39 of the concrete slab 4 may extend into the ground 40 to any desirable depth but preferably to at least midway of the overall height of the receptacle 29 to discourage easy exposure of the receptacle walls by breaking otherwise thin concrete.

In operation coins deposited in the pay telephone 1, instead of remaining in the coin box chamber 8 are directed therethrough by the sleeve 20 and into the tube 18 where they are further directed into the coin box 10 contained beneath the slab 4 in the receptacle foot portion 32. A transparent closure plate 41 of any suitable material such as a transparent synthetic resin is placed in the doorway of the chamber 8 instead of the chamber door 15 to permit visual inspection by a would-be thief for demonstrating that no coins are stored therewithin.

The collection and storage of the coins in a location isolated from the pay telephone discourages the destruction of the telephone for the purpose of illegally obtaining the coins. This invention also directs the coin to a location which is highly inaccessible to the would-be thief. If, however, the thief persists and breaks into the receptacle 29, the cost of repairing the damage is many times smaller than the cost of replacing the telephone instrument. No greater difficulty is presented to the telephone personnel for collecting the coin box 10 from its storage position than heretofore.

It is to be understood that while one form of this invention has been illustrated and described it is not to be limited to the specific form or arrangement of parts herein described and shown except insofar as such limitations are included in the claims.

What we claim and desire to secure by Letters Patent is:

1. Apparatus for discouraging the destruction of a pay telephone and theft of coins contained therein, said telephone being of the type normally having walls forming an integral coin chamber and a coin chute communicating with said coin chamber and a removable locking door for locking said coin chamber, said apparatus comprising:

(*a*) means forming an opening through a wall of said coin box chamber, an elongated tube having an upper end extending through said opening and communicating with said coin chute, said tube extending downwardly from said coin chamber for directing coins away from said telephone, (*b*) walls forming a receptacle spaced from said telephone and having an open mouth and a foot portion communicating with said mouth, said foot portion being spaced below the level of said mouth, said tube having a lower end secured to and opening downwardly into said foot portion for directing coins into said foot portion, (*c*) said mouth being adapted to receive said locking door in closing position thereover and selectively lockably engaged therewith, and (*d*) a slab of break-resistant material having a surface substantially flush with but not covering said mouth, said slab covering said foot portion and surrounding said tube lower end, said slab being positioned to expose only said mouth, (*e*) whereby coins are collected in a safe location spaced from said telephone.

2. Apparatus for discouraging the destruction of a pay telephone and theft of coins contained therein, said telephone being of the type normally having side, top and bottom walls forming an integral coin box chamber and a coin chute communicating with said coin box chamber and a removable self-locking coin box and a coin box actuating assembly in said coin box chamber and a removable locking door for locking said coin box within said coin box chamber, said apparatus comprising;

(*a*) means forming an opening through the bottom wall of said coin box chamber, an elongated tube having an upper end telescoping upwardly into said bottom wall opening and communicating with said coin chute, said tube extending downwardly from said coin box chamber for directing coins away from said telephone, (*b*) walls forming a receptacle having an upwardly extending neck portion terminating in an open mouth and a foot portion communicating with said neck portion, said foot portion being offset laterally from said neck portion and spaced below the level of said mouth, said tube having a lower end secured to and opening downwardly into said foot portion, (*c*) said neck portion being adapted to receive said coin box downwardly thereinto from said open mouth, said foot portion being adapted to receive said coin box from said neck portion and direct said coin box into coin receiving position beneath said tube lower end, (*d*) said coin box actuating assembly being mounted in said foot portion for actuating said coin box into open position when received into said foot portion and locking said coin box closed when withdrawn from said foot portion, (*e*) said mouth being adapted to receive said locking door thereover and selectively lockably engaged therewith, and (*f*) a ground resting slab of poured concrete remotely spaced below said tube upper end, said slab having an upper surface substantially flush with but not covering said mouth, said slab covering said foot portion and surrounding said neck portion and tube lower end, (*g*) whereby coins are collected in a location remote from said pay telephone and protectively covered by concrete.

References Cited by the Examiner

UNITED STATES PATENTS

| | | | |
|---|---|---|---|
| 1,032,876 | 7/12 | Bucknam | 232—12 |
| 1,121,063 | 12/14 | Beck | 232—15 |
| 1,632,536 | 6/27 | Breen | 232—44 X |
| 2,964,237 | 12/60 | Henderson | 232—16 |

FRANK B. SHERRY, *Primary Examiner.*